United States Patent
Armstrong

(10) Patent No.: US 10,523,851 B2
(45) Date of Patent: Dec. 31, 2019

(54) CAMERA ASSEMBLY FOR AN OVEN APPLIANCE

(71) Applicant: Haier US Appliance Solutions, Inc., Wilmington, DE (US)

(72) Inventor: James Lee Armstrong, Louisville, KY (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 0 days.

(21) Appl. No.: 15/898,738

(22) Filed: Feb. 19, 2018

(65) Prior Publication Data

US 2019/0260915 A1    Aug. 22, 2019

(51) Int. Cl.
| | |
|---|---|
| *H04N 5/225* | (2006.01) |
| *H05B 6/64* | (2006.01) |
| *F27B 5/18* | (2006.01) |
| *F24C 15/02* | (2006.01) |
| *F24C 7/08* | (2006.01) |
| *F24C 15/04* | (2006.01) |

(52) U.S. Cl.
CPC ........... *H04N 5/2252* (2013.01); *F24C 7/085* (2013.01); *F24C 15/024* (2013.01); *F24C 15/04* (2013.01); *F27B 5/18* (2013.01); *H05B 6/6411* (2013.01); *H05B 6/6482* (2013.01)

(58) Field of Classification Search
None
See application file for complete search history.

(56) References Cited

U.S. PATENT DOCUMENTS

| | | | |
|---|---|---|---|
| 4,363,957 A | 12/1982 | Tachikawa et al. | |
| 9,615,007 B2 | 4/2017 | Pfaffinger, Jr. et al. | |
| 2013/0319398 A1* | 12/2013 | Braden | F24C 15/04 |
| | | | 126/200 |
| 2014/0048055 A1* | 2/2014 | Ruther | A21B 3/02 |
| | | | 126/198 |
| 2015/0056344 A1* | 2/2015 | Luckhardt | F24C 7/085 |
| | | | 426/233 |
| 2015/0119003 A1 | 4/2015 | Park et al. | |
| 2016/0348918 A1* | 12/2016 | Bhogal | F24C 15/04 |
| 2016/0366314 A1 | 12/2016 | Pfaffinger et al. | |
| 2017/0000292 A1* | 1/2017 | Park | H04N 5/2257 |
| 2017/0074522 A1 | 3/2017 | Cheng | |
| 2017/0115008 A1 | 4/2017 | Erbe et al. | |
| 2018/0058702 A1* | 3/2018 | Jang | F24C 7/04 |
| 2018/0202665 A1* | 7/2018 | Park | F24C 7/085 |
| 2018/0372326 A1* | 12/2018 | Park | H04M 1/72533 |

FOREIGN PATENT DOCUMENTS

| | | |
|---|---|---|
| CN | 205410942 U | 8/2016 |
| DE | 102008042804 B4 | 7/2013 |

* cited by examiner

*Primary Examiner* — James M Hannett
(74) *Attorney, Agent, or Firm* — Dority & Manning, P. A.

(57) ABSTRACT

An oven appliance having a camera assembly for providing images of food items within a cooking chamber includes a chamber wall and a separation panel defining an insulation gap therebetween. The camera assembly includes a housing defining a first end proximate the chamber wall and a second end proximate the separation panel which partially defines an electronics compartment. Viewing windows are positioned within the first and second ends of the housing and a camera is positioned within the electronics compartment and aimed through the viewing windows to generate images without being damaged during high temperature operation of the oven appliance.

20 Claims, 6 Drawing Sheets

CAMERA ASSEMBLY FOR AN OVEN APPLIANCE

FIELD OF THE INVENTION

The present subject matter relates generally to oven appliances, and more particularly, to camera assemblies for oven appliances.

BACKGROUND OF THE INVENTION

Conventional residential and commercial oven appliances generally include a cabinet that defines a cooking chamber for receipt of food items for cooking. Multiple heating elements are positioned within the cooking chamber to provide heat to food items located therein. The heating elements can include, for example, radiant heating elements, such as a bake heating assembly positioned at a bottom of the cooking chamber and/or a separate broiler heating assembly positioned at a top of the cooking chamber.

Notably, it is desirable to provide a camera for generating images of food during a cooking process, e.g., for monitoring cooking progress. However, due to thermal operating limits of cameras, cameras are typically only used in ovens having relatively low peak operating temperatures. Thus, cameras are typically not suitable for use in ovens which include a self-cleaning mode of operation where the cooking chamber is heated to very high temperature, e.g., greater than 800° F., in order to burn off food spills and clean the cooking chamber. Conventional ovens that operate at such high temperatures and include oven cameras frequently require complex and costly cooling systems to maintain the camera temperatures within the desired operating range.

Accordingly, an oven appliance that includes an improved camera assembly would be useful. More particularly, an oven appliance with a camera assembly that provides improved visibility and is not damaged when the oven operates at very high temperatures associated with a self-cleaning mode of operation would be particularly beneficial.

BRIEF DESCRIPTION OF THE INVENTION

The present subject matter provides an oven appliance having a camera assembly for providing images of food items within a cooking chamber. The oven appliance includes a chamber wall and a separation panel defining an insulation gap therebetween. The camera assembly includes a housing defining a first end proximate the chamber wall and a second end proximate the separation panel which partially defines an electronics compartment. Viewing windows are positioned within the first and second ends of the housing and a camera is positioned within the electronics compartment and aimed through the viewing windows to generate images without being damaged during high temperature operation of the oven appliance. Additional aspects and advantages of the invention will be set forth in part in the following description, or may be apparent from the description, or may be learned through practice of the invention.

In a first example embodiment, an oven appliance defining a vertical, a lateral, and a transverse direction is provided. The oven appliance includes a cabinet extending between a top and a bottom along the vertical direction and a cooking chamber positioned within the cabinet and being defined at least in part by a chamber wall, the chamber wall defining a first opening. A separation panel defines a second opening and being spaced apart from the chamber wall to define an insulation gap and a camera assembly provides images of food items within the cooking chamber. The camera assembly includes a housing defining a first end positioned at the first opening in the chamber wall and a second end positioned at the second opening defined in the separation panel. A first viewing window is mounted within the first end of the housing, a second viewing window is mounted within the second end of the housing, and a camera is positioned outside the housing and adjacent the second viewing window.

In a second example embodiment, a camera assembly for providing images of food items within a cooking chamber of an oven appliance is provided. The cooking chamber is defined at least in part by a chamber wall and a separation panel is spaced apart from the chamber wall to define an insulation gap. The camera assembly includes a housing defining a first end positioned at a first opening in the chamber wall and a second end positioned at a second opening defined in the separation panel. A first viewing window is mounted within the first end of the housing, a second viewing window is mounted within the second end of the housing, and a camera is positioned outside the housing and adjacent the second viewing window.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
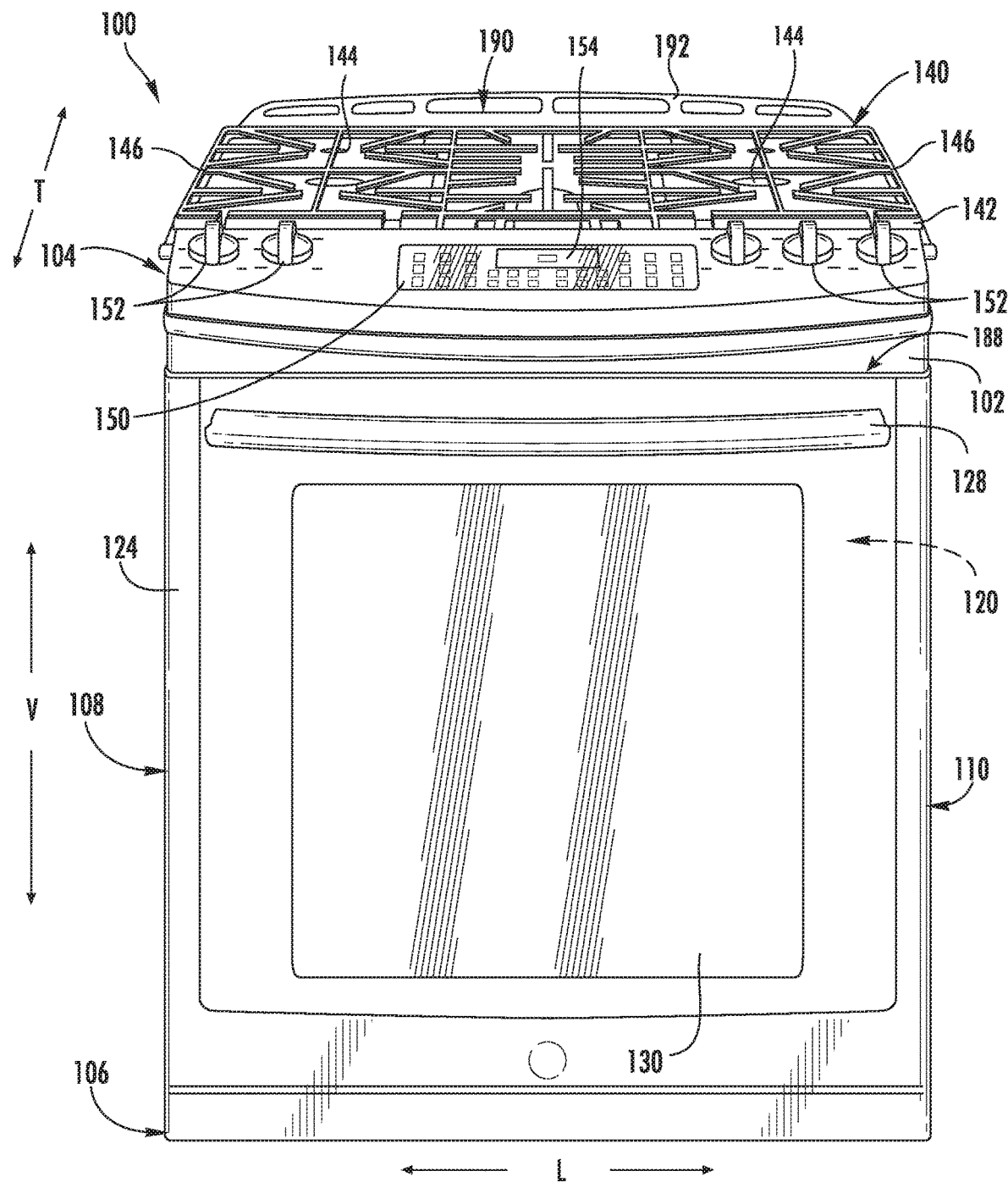
FIG. 1 is a front, perspective view of an oven appliance according to an exemplary embodiment of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 provides a front, perspective view of an oven appliance 100 as may be employed with the present subject matter. Oven appliance 100 generally defines a vertical direction V, a lateral direction L, and a transverse direction T, each of which is mutually perpendicular, such that an orthogonal coordinate system is generally defined. As illustrated, oven appliance 100 includes an insulated cabinet 102. Cabinet 102 of oven appliance 100 extends between a top 104 and a bottom 106 along the vertical direction V, between a first side 108 (left side when viewed from front) and a second side 110 (right side when viewed from front) along the lateral direction L, and between a front 112 and a rear 114 along the transverse direction T.

Within cabinet 102 is a single cooking chamber 120 which is configured for the receipt of one or more food items to be cooked. However, it should be appreciated that oven appliance 100 is provided by way of example only, and aspects of the present subject matter may be used in any suitable cooking appliance, such as a gas or electric double oven range appliance. Thus, the example embodiment shown in FIG. 1 is not intended to limit the present subject matter to any particular cooking chamber configuration or arrangement.

Oven appliance 100 includes a door 124 rotatably attached to cabinet 102 in order to permit selective access to cooking chamber 120. Handle 128 is mounted to door 124 to assist a user with opening and closing door 124 in order to access cooking chamber 120. As an example, a user can pull on handle 128 mounted to door 124 to open or close door 124 and access cooking chamber 120. A glass window pane 130 provides for viewing the contents of cooking chamber 120 when door 124 is closed and also assist with insulating cooking chamber 120. Heating elements 132 (FIGS. 2 and 3), such as electric resistance heating elements, gas burners, microwave heating elements, halogen heating elements, or suitable combinations thereof, are positioned within cooking chamber 120 for heating cooking chamber 120. According to an exemplary embodiment, oven appliance 100 is a self-cleaning oven. In this regard, heating elements 132 may be configured for heating cooking chamber 120 to a very high temperature (e.g., 800° F. or higher) in order to burn off any food residue or otherwise clean cooking chamber 120.

Oven appliance 100 also includes a cooktop 140. Cooktop 140 is positioned at or adjacent top 104 of cabinet 102. Thus, cooktop 140 is positioned above cooking chamber 120. Cooktop 140 includes a top panel 142 positioned proximate top 104 of cabinet 102. By way of example, top panel 142 may be constructed of glass, ceramics, enameled steel, and combinations thereof. A plurality of burner assemblies 144 are mounted within or on top of top panel 142. Oven appliance 100 may include one or more grates 146 configured to support cooking utensils, such as pots or pans, over burner assemblies 144.

Grates 146 are supported on a top surface of top panel 142 such that burner assemblies 144 provide thermal energy to cooking utensils positioned thereon, e.g., to heat food and/or cooking liquids (e.g., oil, water, etc.). As shown in FIG. 1, burners assemblies 144 can be configured in various sizes so as to provide e.g., for the receipt of cooking utensils (i.e., pots, pans, etc.) of various sizes and configurations and to provide different heat inputs for such cooking utensils. According to alternative embodiments, oven appliance 100 may have other cooktop configurations or burner elements. For example, cooktop 140 could alternatively include electric burners, induction burners, or any other suitable type and configuration of heating element.

A user interface panel 150 is located within convenient reach of a user of the oven appliance 100. For this example embodiment, user interface panel 150 includes knobs 152 that are each associated with one of burner assemblies 144. In this manner, knobs 152 allow the user to activate each burner assembly 144 and determine the amount of heat input provided by each burner assembly 144 to a cooking utensil located thereon. Although shown with knobs 152, it should be understood that knobs 152 and the configuration of oven appliance 100 shown in FIG. 1 is provided by way of example only. More specifically, user interface panel 150 may include various input components, such as one or more of a variety of touch-type controls, electrical, mechanical or electro-mechanical input devices including rotary dials, push buttons, and touch pads. User interface panel 150 may also be provided with one or more graphical display devices or display components 154, such as a digital or analog display device designed to provide operational feedback or other information to the user such as e.g., whether a particular burner assembly is activated and/or the rate at which the burner assembly is set.

Although aspects of the present subject matter are described herein in the context of a single oven appliance, it should be appreciated that oven appliance 100 is provided by way of example only. Other oven or range appliances having different configurations, different appearances, and/or different features may also be utilized with the present subject matter, e.g., double ovens, electric cooktop ovens, induction cooktops ovens, etc. Moreover, aspects of the present subject matter may be used in any other consumer or commercial appliance where it is desirable to use a camera in a high temperature environment.

Figure 2:
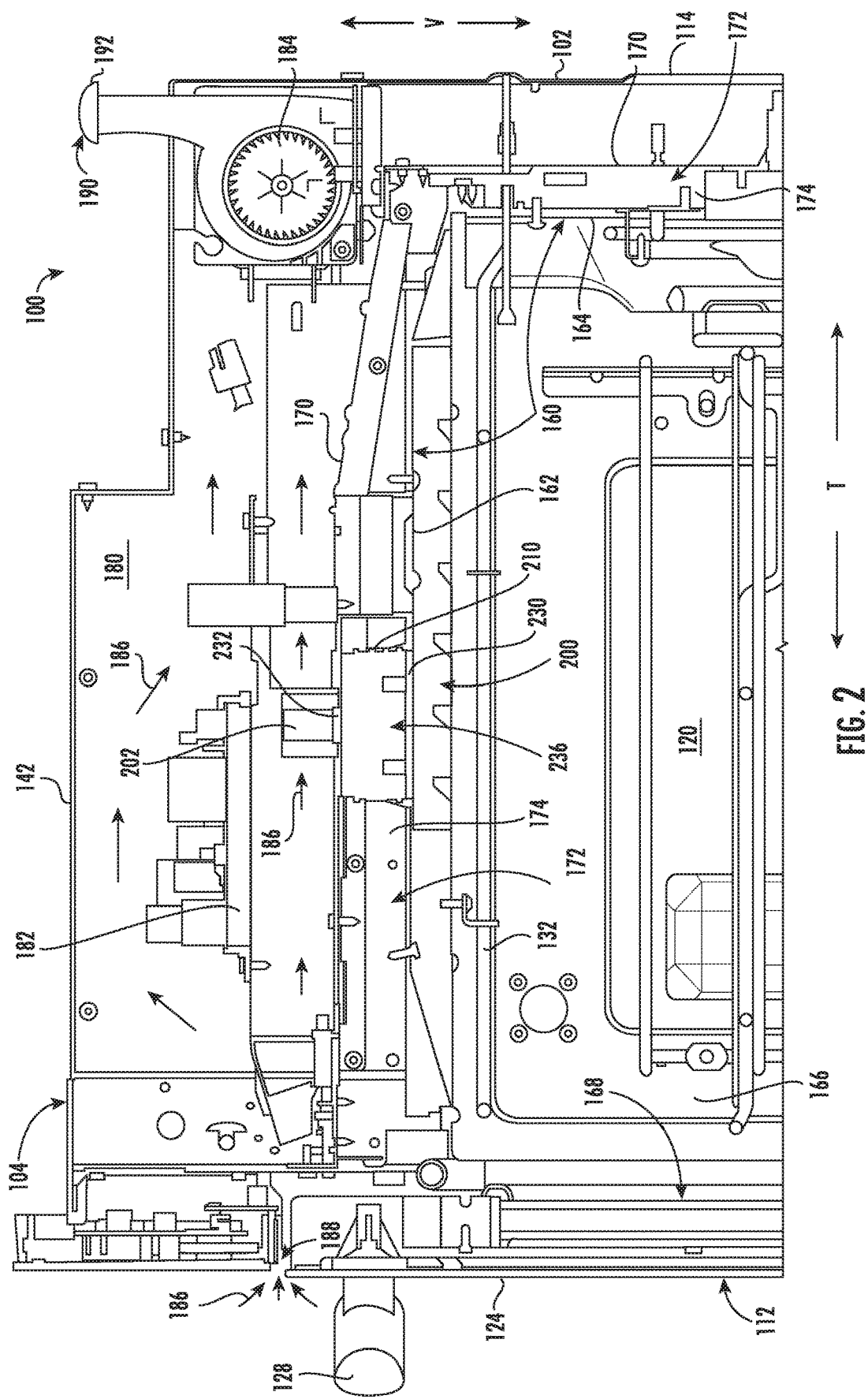
FIG. 2 is a side, cross sectional view of the exemplary oven appliance of FIG. 1.

As best shown in FIG. 2, cooking chamber 120 is defined by a plurality of chamber walls 160. Specifically, cooking chamber 120 may be defined by a top wall 162, a rear wall 164, a bottom wall (not shown), and two sidewalls 166. Chamber walls 160 may be joined together to define an opening 168 through which a user may selectively access cooking chamber 120 by opening door 124. In order to insulate cooking chamber 120, oven appliance 100 includes further includes a separation panel 170 that is spaced apart from one or more of chamber walls 160 to define an insulation gap 172 there between. According to an exemplary embodiment, insulation gap 172 is filled with insulating material 174, such as insulating foam or fiberglass, for insulating cooking chamber 120.

According to an exemplary embodiment, separation panel 170 may extend all the way around cooking chamber 120, e.g., such that is spaced apart from each of chamber walls 160. Separation panel 170 may be formed from a single piece of sheet metal, or may be multiple panels joined together in a manner similar to chamber walls 160. As specifically shown in FIG. 2, separation panel 170 is spaced apart from top wall 162 and extends substantially parallel to top wall 162 to define insulation gap 172 having a relatively uniform thickness. However, it should be appreciated that the thickness of insulation gap 172 may be non-uniform as required by space considerations and may vary, e.g., depending on what type of insulation 174 is used.

Figure 3:
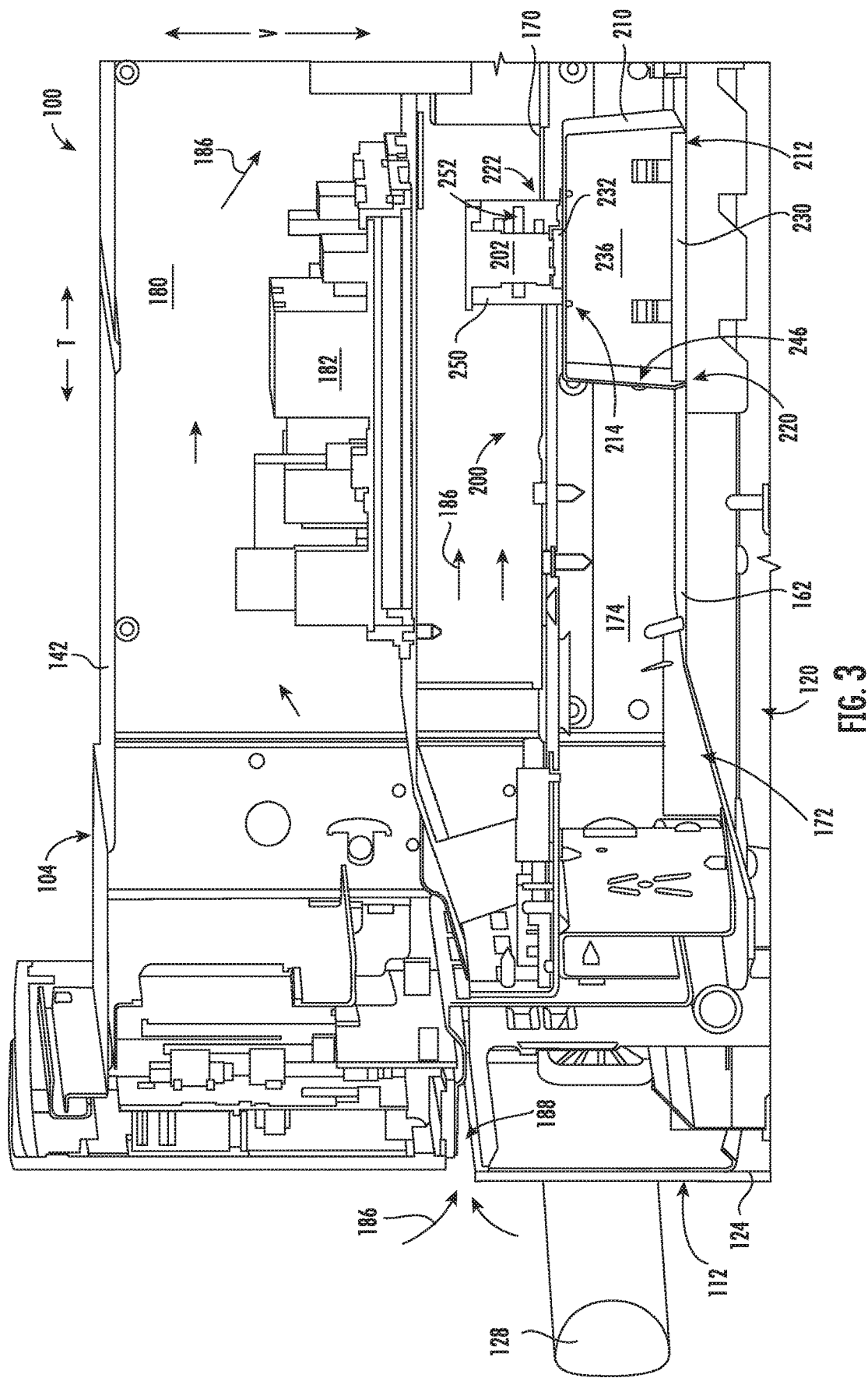
FIG. 3 is another side, cross sectional view of the exemplary oven appliance of FIG. 1.
Figure 4:
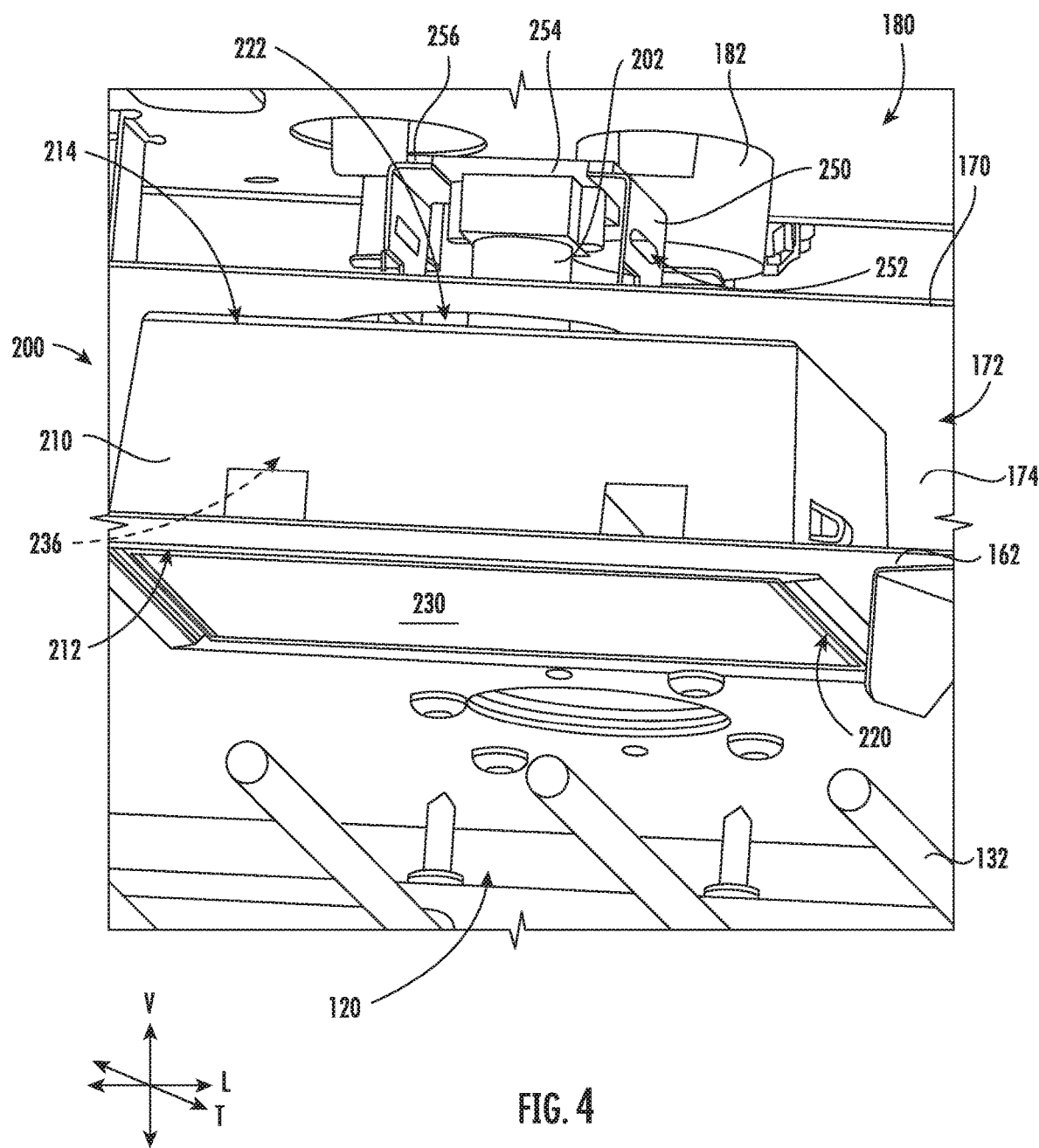
FIG. 4 is a close-up, perspective view of a camera assembly in the exemplary oven appliance of FIG. 1 according to an exemplary embodiment of the present subject matter.

Referring now specifically to FIGS. 2 through 4, and electronics compartment 180 may be defined at least in part by separation panel 170. In this regard, for example, separation panel 170 forms a bottom wall of electronics compartment 180 which extends from front 112 to rear 114 of oven appliance 100. According to the illustrated embodiment, top panel 142 may define the top of electronics compartment 180. Notably, electronics compartment 180 contains various electronic components 182 which are used to facilitate operation of oven appliance 100.

Excessive heat within electronics compartment 180 may damage electronic components 182. Therefore, oven appliance 100 may include a means for cooling electronics compartment 180. Specifically, according to the illustrated embodiment, oven appliance 100 includes a cooling fan 184 that is in fluid communication with electronics compartment 180 for urging a flow of cooling air (as indicated by arrows 186) through electronics compartment 180 for cooling electronic components 182 positioned therein. According to the illustrated embodiment, cooling fan 184 is a centrifugal fan positioned proximate rear 114 of oven appliance 100. However, it should be appreciated that according to alternative embodiments, cooling fan 184 may be any suitable type of fan positioned at any suitable location in fluid communication with electronics compartment 180.

In order to evacuate heat from electronics compartment, cooling fan 184 urges the flow of cooling air 186 from an inlet 188 positioned proximate front 112 of oven appliance, through electronics compartment 180, and out a discharge vent 190 (which may be routed in any suitable direction, as described briefly below). According to the illustrated embodiment, inlet 188 is positioned between door 124 and user interface panel 150. In addition, oven appliance 100 includes vent trim 192 that is positioned proximate rear 114 of oven appliance 100 and extends substantially the full width of cabinet 102 between first side 108 second side 110 along the lateral direction L. So positioned, vent trim 192 provides a good path for hot air to escape cabinet 102 without disturbing a user of oven appliance 100. According to the illustrated embodiment, vent trim 192 is a positioned at top panel 142 above cooling fan 184 and discharge vent 190 includes a plurality of elongated slots or vent apertures defined within vent trim 192. According to other embodiments, oven appliance 100 may include an exhaust conduit that extends to any suitable location and terminates in discharge vent 190 for exhausting the flow of cooling air, e.g., such as out a back of oven appliance 100 or to an external discharge conduit that discharges outdoors.

Referring now generally to FIGS. 2 through 6, oven appliance 100 may further include a camera assembly 200 which is generally configured for providing images of food items that are cooking within cooking chamber 120. In this regard, for example, camera assembly 200 includes a camera 202 that is configured for taking still images or video and transmitting those images to a user to provide feedback regarding the cooking process. For example, camera 202 can provide a live image or video to display 154 (FIG. 1) upon user request. According to still other embodiments, camera 202 may be a thermal imaging device or any other device for providing the user with feedback regarding the food items being cooked within cooking chamber 120.

Notably, cameras have thermal operating limits which may not be suitable for use in oven appliance 100. For example, camera components such as processing chips may be rated for operation within a specific temperature range or up to a specific threshold. In order to ensure that camera 202 may safely operate in oven appliance 100, particularly during the self-cleaning cycle, aspects of the present subject matter provide thermal barriers, a safe operating distance, and other features for permitting the use of camera 202 in oven appliance 100.

As illustrated, camera assembly 200 includes a housing 210 that is intended to thermally insulated camera 202 from thermal energy within cooking chamber 120 while also permitting camera to capture high quality images of food items within cooking chamber 120. In this regard, housing 210 may define a first end 212 and an opposite second end 214 that are spaced apart from each other. More specifically, according to the illustrated embodiment, housing 210 is positioned proximate a center of top wall 162 such that first end 212 and second end 214 are separated along the vertical direction V. Although housing 210 is illustrated as being positioned within top wall 162 and oriented downward to capture images of food items, it should be appreciated that the scope of the present subject matter is not limited to such a configuration. For example, according to alternative embodiments, housing 210 may be positioned adjacent any chamber wall 160 and may be oriented in any other suitable direction.

Notably, housing 210 is positioned at least in part within insulation gap 172. More specifically, according to the illustrated embodiment, housing 210 extends from top wall 162 to separation panel 170 along the vertical direction V, e.g., all the way through insulation 174. In this regard, top wall 162 defines a first opening 220 that is configured for receiving first end 212 of the housing 210. Similarly, separation panel 170 defines a second opening 222 (FIG. 4) that is configured for receiving second end 214 of housing 210. Although first end 212 and second and 214 of housing 210 are illustrated as being flush with first opening 220 and second opening 222, respectively, it should be appreciated that according to alternative embodiments, housing 210 may stop short of or extend into cooking chamber 120 and/or electronics compartment 180.

Figure 6:
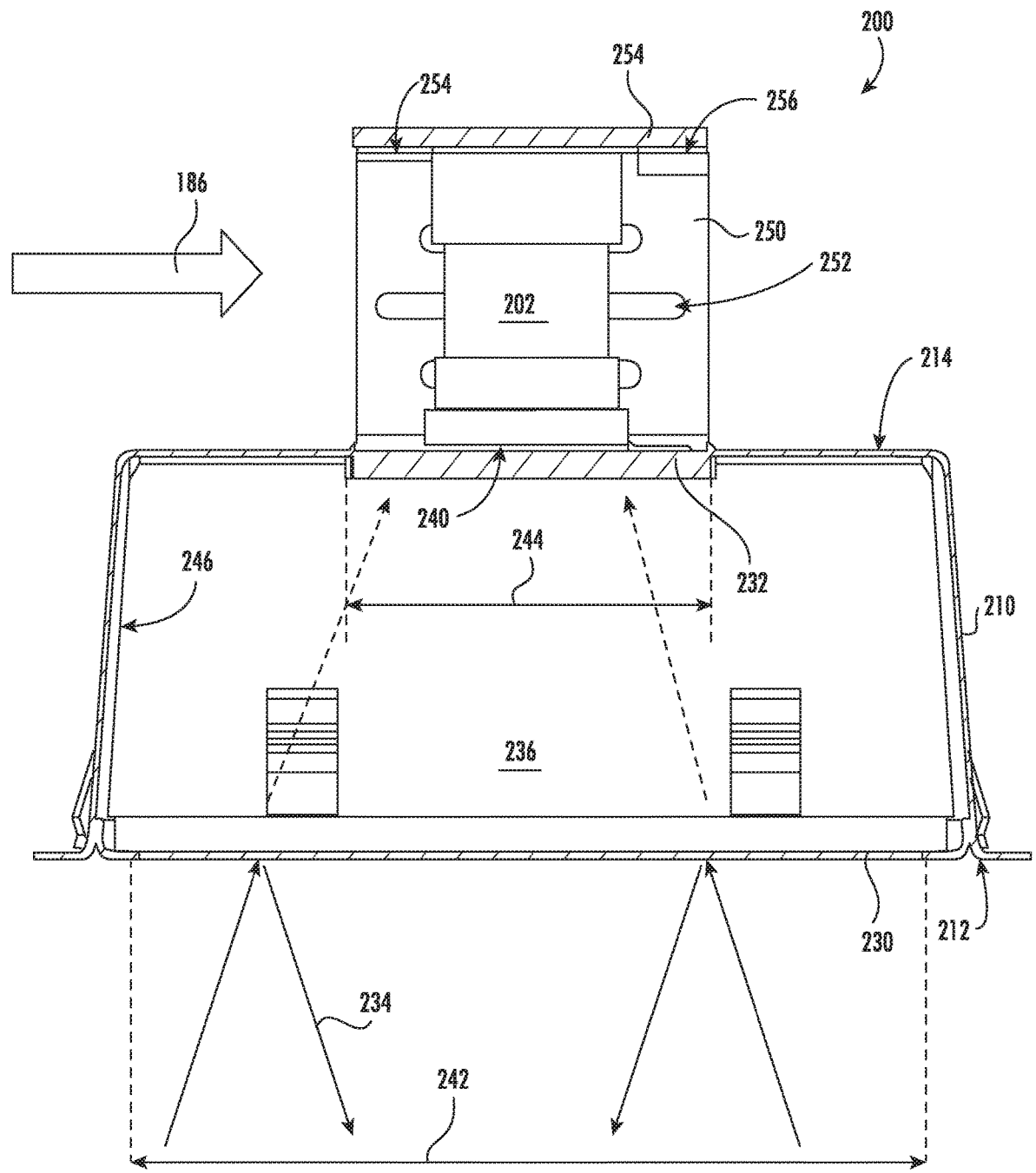
FIG. 6 is a side, cross sectional view of the exemplary camera assembly of FIG. 4.

As best illustrated in FIG. 6, camera assembly 200 further includes a first viewing window 230 that is mounted within the first end 212 of housing 210. In addition, camera assembly 200 includes a second viewing window 232 that is mounted within the second end 214 of housing 210. According to an exemplary embodiment, first viewing window 230 and second viewing window 232 are glass panes configured for stopping large portions of radiant energy (identified by arrows 234). An air gap 236 is defined between first viewing window 230 and second viewing window 232. In this regard, air gap 236 insulates camera 202 by providing a conductive thermal break between the hot air within cooking chamber 120 and camera 202. Notably, the use of two glass pane viewing windows 230, 232 spaced apart by air gap 236 rejects substantially all of the radiant energy 234 within cooking chamber 120 from reaching camera 202 while providing a thermal break from heat conduction. It should be appreciated that as used herein, terms of approximation, such as "approximately," "substantially," or "about," refer to being within a ten percent margin of error.

According to the illustrated embodiment, camera 202 is positioned outside housing 210 and adjacent second viewing window 232. In this regard, camera 202 is positioned at least partially within electronics compartment 180 such that the flow of cooling air 186 may cool camera 202 during operation. Camera 202 may include a lens 240 that is aimed downward along the vertical direction V through second viewing window 232, air gap 236, and first viewing window 230 into cooking chamber 120. Notably, by insulating camera 202 from cooking chamber 120 using housing 210, and by positioning camera 202 within electronics compartment 180 (which is cooled by cooling fan 184), camera assembly 200 may be used in an oven appliance that performs self-cleaning operations at temperatures as high as 800° F. and higher.

Camera assembly 200 may include other features for enabling improved imaging of food items within cooking chamber 120. For example, according to the illustrated embodiment, first viewing window 230 defines a first area (e.g., as shown by first width 242 in the cross-section of FIG. 6). Similarly, second viewing window 232 defines a second area (e.g., as shown by second width 244 in the cross-section of FIG. 6). In order to provide a wide field-of-view for camera 202, the first area is larger than the second area. For example, according to the illustrated embodiment, the first area is approximately three times the second area. In addition, an interior surface 246 of housing 210 may include a dark matte finish to reduce glare which may affect the image produced by camera 202. Camera assembly 200 may define other features for improving the imaging process according to alternative embodiments while remaining within the scope of the present subject matter.

Figure 5:
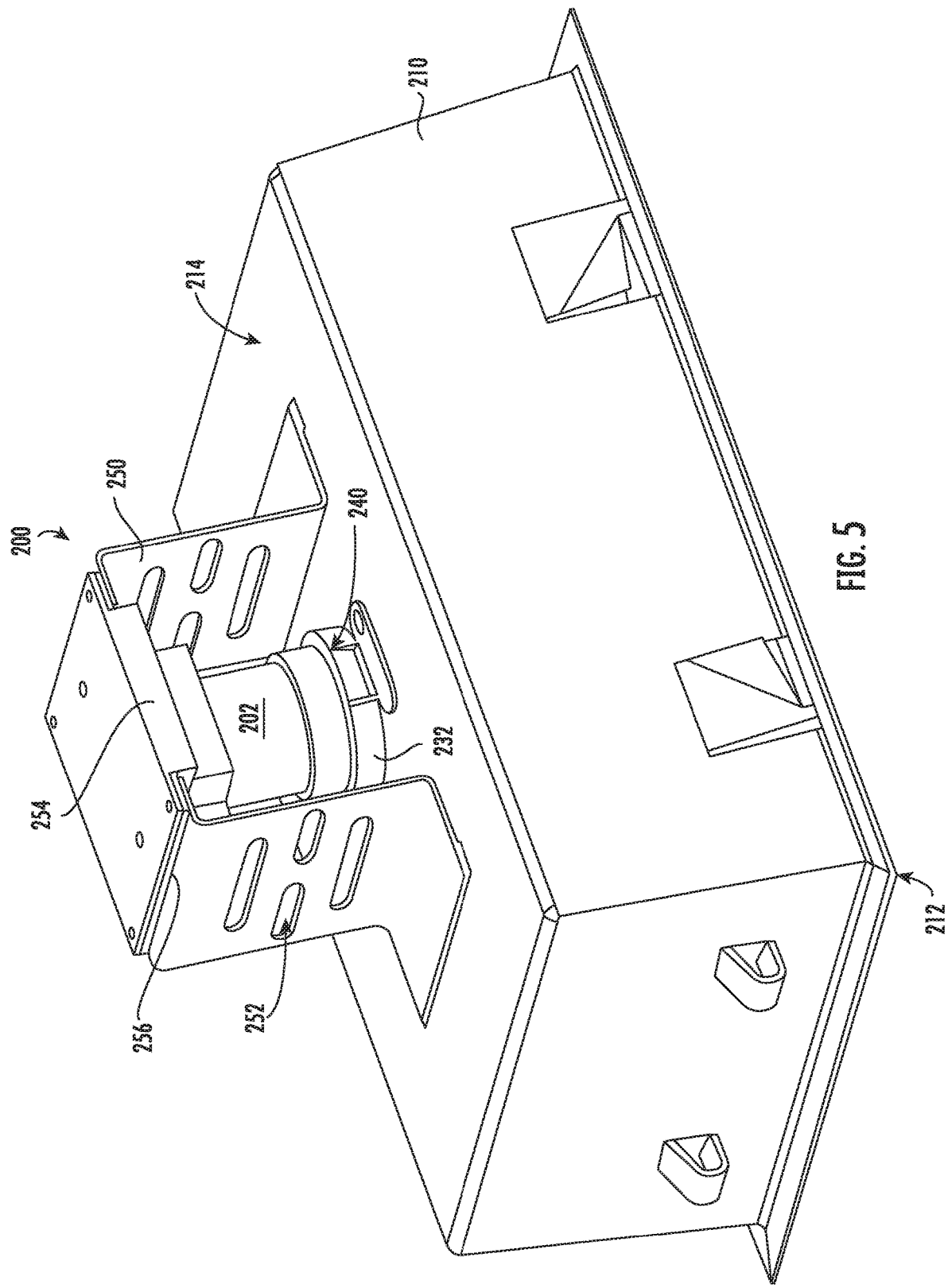
FIG. 5 is a perspective view of the exemplary camera assembly of FIG. 4.

Referring now specifically to FIGS. 5 and 6, camera 202 is mounted to housing 210 using one or more camera support brackets 250. More specifically, as illustrated, camera 202 is supported by two camera support brackets 250 which extend from the second end 214 of housing 210 upward along the vertical direction V away from cooking chamber 120. Moreover, camera support brackets 250 extend substantially parallel to the flow of cooling air 186 in order to permit maximum cooling flow over camera 202 and its components. Although camera 202 is illustrated as being supported by two camera support brackets 250 it should be appreciated that any suitable number and style of support brackets may be used according to alternative embodiments.

As shown, camera support brackets 250 generally define one or more apertures 252 which provide a conductive thermal break from housing 210 as well as permit the flow of cooling air 186 in and around camera 202. In addition, camera 202 may be mounted indirectly to camera support brackets 250 through a control board 254. In this regard, control board 254 extends within a horizontal plane between the two camera support brackets 250 and may be attached thereto in any suitable manner. Camera 202 is then mounted to and electrically connected with control board 254 and extends downward toward second viewing window 232. According to the illustrated embodiment, lens 240 of camera 202 is positioned immediately adjacent second viewing window 232 along the vertical direction V. However, according to alternative embodiments, lens 240 may be spaced apart slightly from second viewing window 232 such that is not in direct contact with second viewing window 232.

Still referring to FIGS. 5 and 6, camera assembly 200 may further include a thermally insulating spacer 256 that is positioned between camera support brackets 250 and control board 254. In this regard, for example, camera support brackets 250 may be constructed of stamped sheet-metal to be able to withstand high temperatures while thermally insulating spacer 236 may be constructed of a plastic material to reduce the conduction of thermal energy to control board 254. Although camera assembly 200 is described herein according to an exemplary embodiment, it should be appreciated that camera assembly 202 may be positioned in another location within oven appliance 100, may include additional features for reducing the heat experienced by camera 202 and control board 254, and may be configured in any other manner for providing improved imaging during a cooking process.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An oven appliance defining a vertical, a lateral, and a transverse direction, the oven appliance comprising:
    a cabinet extending between a top and a bottom along the vertical direction;
    a cooking chamber positioned within the cabinet and being defined at least in part by a chamber wall, the chamber wall defining a first opening;
    a separation panel defining a second opening and being spaced apart from the chamber wall to define an insulation gap; and
    a camera assembly for providing images of food items within the cooking chamber, the camera assembly comprising:
        a housing defining a first end positioned at the first opening in the chamber wall and a second end positioned at the second opening defined in the separation panel, wherein a sidewall extends between the first end and the second end to define an air gap therebetween;
        a first viewing window mounted within the first end of the housing;
        a second viewing window mounted within the second end of the housing and being spaced apart from the first viewing window by the air gap and
        a camera positioned outside the housing and adjacent the second viewing window.

2. The oven appliance of claim 1, wherein the separation panel at least partially defines an electronics compartment, the camera being positioned at least partially within the electronics compartment.

3. The oven appliance of claim 2, wherein a cooling fan is in fluid communication with the electronics compartment for urging a flow of cooling air through the electronics compartment.

4. The oven appliance of claim 1, wherein the camera is mounted to one or more camera support brackets that extend from the second end of the housing away from the cooking chamber.

5. The oven appliance of claim 4, wherein the camera support brackets define one or more apertures to provide a conductive thermal break from the housing.

6. The oven appliance of claim 4, wherein the camera support brackets extend into an electronics compartment substantially parallel to a flow of air being urged through the electronics compartment.

7. The oven appliance of claim 4, wherein the camera is mounted to a control board that is mounted to the camera support brackets.

8. The oven appliance of claim 7, wherein a thermally insulating spacer is positioned between camera support brackets and the control board.

9. The oven appliance of claim 1, wherein the first viewing window defines a first area and the second viewing window defines a second area, the first area being larger than the second area to define a wide field of view for the camera.

10. The oven appliance of claim 1, comprising heating elements configured for heating the cooking chamber to a temperature of greater than 800° F.

11. A camera assembly for providing images of food items within a cooking chamber of an oven appliance, the cooking chamber being defined at least in part by a chamber wall and a separation panel being spaced apart from the chamber wall to define an insulation gap, the camera assembly comprising:
    a housing defining a first end positioned at a first opening in the chamber wall and a second end positioned at a second opening defined in the separation panel, wherein a sidewall extends between the first end and the second end to define an air gap therebetween;
    a first viewing window mounted within the first end of the housing;
    a second viewing window mounted within the second end of the housing and being spaced apart from the first viewing window by the air gap; and
    a camera positioned outside the housing and adjacent the second viewing window.

12. The camera assembly of claim 11, wherein the separation panel at least partially defines an electronics compartment, the camera being positioned at least partially within the electronics compartment, and wherein a cooling fan is in fluid communication with the electronics compartment for urging a flow of cooling air through the electronics compartment.

13. The camera assembly of claim 11, wherein the camera is mounted to one or more camera support brackets that extend from the second end of the housing away from the cooking chamber, and wherein the camera support brackets define one or more apertures to provide a conductive thermal break from the housing.

14. The camera assembly of claim 11, wherein the first viewing window defines a first area and the second viewing window defines a second area, the first area being larger than the second area to define a wide field of view for the camera.

15. The oven appliance of claim 2, wherein the cooling fan is a centrifugal fan positioned proximate a rear of the oven appliance.

16. The oven appliance of claim 1, wherein the camera is positioned entirely within the electronics compartment.

17. The oven appliance of claim 1, wherein the insulation gap defines a first gap height and the air gap defines a second gap height, the first gap height being substantially equivalent to the second gap height.

18. The oven appliance of claim 1, wherein the separation panel extends substantially within a horizontal plane parallel to the chamber wall.

19. The oven appliance of claim 9, wherein the first area is approximately three times the second area.

20. An oven appliance defining a vertical, a lateral, and a transverse direction, the oven appliance comprising:
    a cooking chamber defined at least in part by a chamber wall, the chamber wall defining a first opening;
    a separation panel defining a second opening and being spaced apart from and substantially parallel to the chamber wall to define an insulation gap having uniform thickness;
    a housing defining a first end positioned at the first opening in the chamber wall and a second end positioned at the second opening defined in the separation panel, the housing comprising a sidewall having a height substantially equivalent to the uniform thickness;
    a first viewing window mounted within the first end of the housing;
    a second viewing window mounted within the second end of the housing and being spaced apart from the first viewing window by an air gap; and
    a camera positioned outside the housing and adjacent the second viewing window.

\* \* \* \* \*